W. Massey.

Upsetting Tires.

No. 887. Reissued Jan. 24, 1860.

Witnesses:

J. A. C. Tauberschmidt

E. N. Jones

Inventor:

W. Massey.

C. L. Crowell & R. Smith assignees by their attorney

H. Southgate Smith

THE GRAPHIC CO. PHOTO-LITH. 39 & 41 PARK PLACE, N.Y.

UNITED STATES PATENT OFFICE.

C. L. CROWELL AND ROBERT SMITH, OF PEORIA, ASSIGNEES OF WILLIAM MASSEY, OF GREENE COUNTY, ILLINOIS.

MACHINE FOR CONTRACTING THE CIRCUMFERENCE OF WROUGHT-IRON BANDS.

Specification forming part of Letters Patent No. 6,573, dated July 3, 1849; Reissue No. 887, dated January 24, 1860.

*To all whom it may concern:*

Be it known that WILLIAM MASSEY, of the county of Greene, State of Illinois, has invented a new and useful machine for contracting or upsetting metallic bars or bands, of which the following is a full, clear, and accurate description, reference being had to the accompanying drawings, forming a part of this specification, in which—

Figure 1:
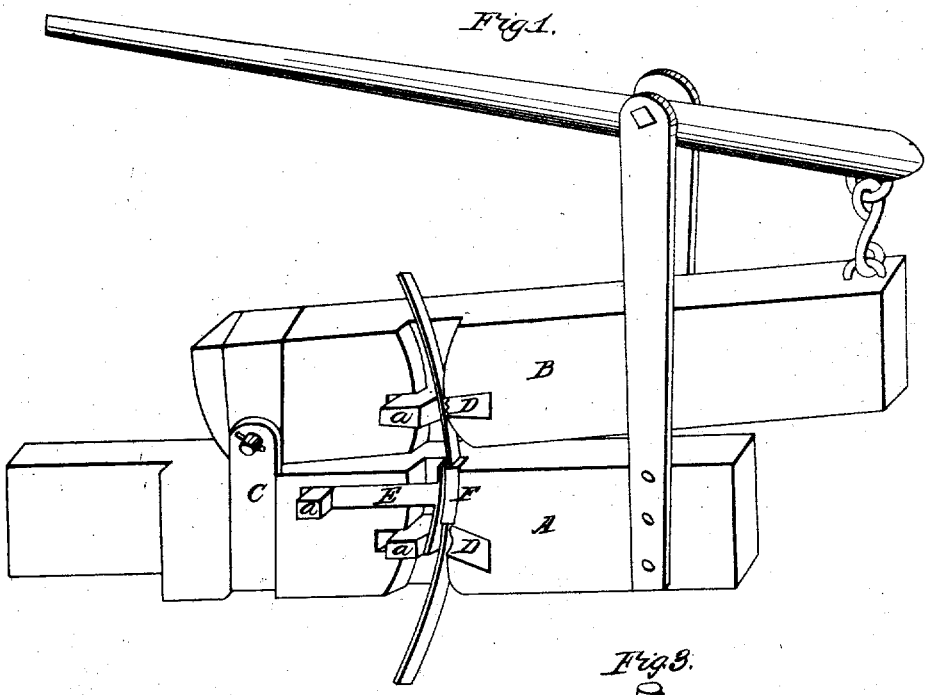
Figure 2:
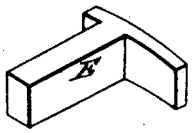
Figure 3:
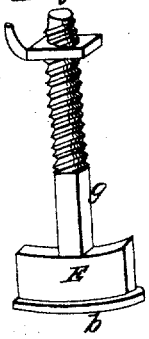

Figure 1 represents a perspective view of a machine for upsetting or contracting bars of metal. Fig. 2 represents a perspective view of the inner rest or guide plate forming the lower part of the matrix. Fig. 3 represents a perspective view of the outer rest or guide-plate forming the upper part of the mold.

In contracting metal bands in order to vary the circumference of the band the process heretofore adopted has been in bands to cut out a piece and again weld them up. This process has been found particularly objectionable as applied to the bands or tires of vehicles, from the difficulty of welding them when they are partially worn and the structure of the metal changed, and from the liability of burning the iron and destroying the tire during the process of welding.

In contracting metal bars longitudinally to increase their dimensions and vary their form at given points from the end the usual process adopted is to heat the bar at this point and increase its size by the process termed "upsetting"—that is, by clamping one end of the bar and striking on the other end—or by what is termed "jumping" the bar—that is, holding the bar at one end and striking the opposite on an anvil.

To give the required form to the bar after it is enlarged or upset it is again heated and brought into shape under the hammer. This process of upsetting and varying the form of bars at the point upset is slow and expensive, and requires great experience to upset the bar at the precise point, and give to it the required form.

To contract the circumference of metallic bands by compression without cutting and welding the same; to upset or diminish the length of metallic bars at given points from the end by compression; to give the required form or size to the band at the point at which it is contracted, or to vary the form and outline of the bar at the point at which it is upset and while being compressed, is the object of this invention.

In the accompanying drawings is represented the machine for accomplishing these objects. This machine consists of two levers, A and B, connected together at one end by the hinge-joint C. Each lever is provided with a clamping-jaw consisting of a metallic block, D, with a serrated face and a holding or fastening wedge, *a*, by which the metal bar or band to be upset is clamped to each lever. The lever A is provided with an adjustable and divided mold, consisting of two parts, E and F. The part E is slightly curved on the face and extends between the wedge *a* and the serrated block D, and from the under side extends a shank which bears against a wedge, *d*, by which it is adjusted in the direction of the serrated blocks. The other part, F, of the mold is in the present instance made concave to conform to the exterior surface of a band or tire. Attached to the inner edge of this part is a shank, *g*, which passes through the lever A, and is provided with a thumb-screw by which it may be drawn in or adjusted in a direction at right angles to the part E. On the outer edge of this part is a projecting lip or flange, *b*, which extends over the edge of the part E when both are near each other, and regulates the width of the mold. In upsetting or compressing metal bars or bands the part E of the mold serves as a rest, and may be used independently of the part F, unless a specified form is desired to be given to that portion of the bar which is upset. The two parts in connection form a mold, the one giving form to one side of the bar, while the other gives form to the opposite side, and by adjusting the part E the thickness of the bar at the point at which it is upset is regulated. The overlapping lip regulates the breadth of the mold, and consequently the breadth of the bar at the point at which it is upset. In using the machine for upsetting or compressing metal bars or bands, the bar is first heated, if necessary, the levers opened the distance it is desired to shorten the band or bar, or to give the necessary amount of metal to fill the mold. The mold is adjusted to give the required size to the bar at the point at which it is upset. The bar is then clamped rigidly to each lever by driving the clamping-wedges. The levers are then brought toward each other, by which the bar or band is compressed or upset from opposite directions, and shortened and enlarged at that part between the two clamping-jaws, and caused to fill the mold, which gives to this part of the bar the reverse of the form of its outline.

What we claim as the invention of WILLIAM MASSEY, and desire to secure by Letters Patent, is—

1. The combination of two clamping-jaws or their equivalent, arranged, substantially as described, so that a band or bar held by these jaws is caused to be contracted or upset in length by their movement toward each other, for the purpose set forth.

2. In combination with the clamping-jaws, a mold or matrix, or its equivalent, arranged between the jaws, substantially as described, for the purpose set forth.

3. In combination with the clamping-jaws, the adjustable rest E, or its equivalent, arranged, substantially as described, to support one side of the bar.

In testimony whereof we have subscribed our names.

C. L. CROWELL,
ROBERT SMITH,
*Assignees.*

In presence of—
BERNARD BAILY,
DAVID A. WHEELER.